United States Patent [19]

Koutsky

[11] 4,183,493

[45] Jan. 15, 1980

[54] ROLLER FORE-AFT ADJUSTMENT FOR A VEHICLE SEAT

[75] Inventor: L. John Koutsky, Milan, Ill.

[73] Assignee: Sears Manufacturing Company, Davenport, Iowa

[21] Appl. No.: 876,515

[22] Filed: Feb. 9, 1978

Related U.S. Application Data

[63] Continuation-in-part of Ser. No. 758,979, Jan. 13, 1977.

[51] Int. Cl.² ............................................. B60N 1/08
[52] U.S. Cl. ................................. 248/430; 308/3 R
[58] Field of Search ............... 248/430, 429; 297/349; 308/3 R

[56] References Cited

U.S. PATENT DOCUMENTS

| | | | |
|---|---|---|---|
| 1,701,044 | 2/1929 | Knaur | 248/430 |
| 1,891,457 | 12/1932 | Stannard | 248/429 |
| 3,469,611 | 9/1969 | Dunlap | 308/3 R |
| 3,620,495 | 11/1971 | Korab | 248/430 |

FOREIGN PATENT DOCUMENTS

| | | |
|---|---|---|
| 4792 of 1904 | United Kingdom | 248/429 |
| 382052 10/1932 | United Kingdom | 248/430 |

Primary Examiner—Francis K. Zugel
Attorney, Agent, or Firm—Henderson & Sturm

[57] ABSTRACT

A fore-aft adjustment, for a vehicle seat, employing rollers. The vehicle seat includes a seat assembly coupled to a support assembly. The support assembly includes a first portion affixed to the vehicle and a second portion affixed to the seat assembly. One of said first or second portions includes a plurality of roller structures having rotational axes which are substantially vertical. The other of said first or second portions includes guide members, the roller structures rotatably engaging the guide members to provide for longitudinal movement of the seat assembly with respect to the vehicle.

7 Claims, 6 Drawing Figures

ROLLER FORE-AFT ADJUSTMENT FOR A VEHICLE SEAT

BACKGROUND OF THE INVENTION

This is a continuation-in-part of application Ser. No. 758,979 filed Jan. 13, 1977.

This invention relates to vehicle seats and their adjustment mechanisms. More particularly, this invention relates to seats for off-highway vehicles and fore-aft adjustment mechanisms provided therefor.

Currently, seats for off-highway vehicles employ a slide mechanism for front-rear adjustment. A pair of rails are affixed to the vehicle. The underside of the seat bears a pair of depending, elongated flanges. The flanges fit within the rails and slide longitudinally with respect to the rails as the seat is moved for fore-aft adjustment. Alternately, the rails may be affixed to the underside of the seat, and the flanges may be affixed to the vehicle and extend upwardly therefrom. A second type of slide mechanism also employs a pair of rails affixed to the vehicle. The underside of the seat bears block members wrapped around depending flanges which slide within and longitudinally with respect to the rails as the seat is adjusted. Again, the positions of the rails and the flanges bearing block members may be interchanged.

The aforementioned slide mechanisms have a number of inadequacies. Off-highway vehicles, particularly those employed in the various construction industries, are operated frequently in an environment of dirt and debris. It is extremely difficult, if not impossible, to prevent dirt and debris from reaching the vehicle seat and settling in the slide mechanism. When this occurs, the slide mechanism can become jammed or, at the very least, extremely difficult to operate.

Even when there is no fouling by dirt and debris, the slide mechanisms are difficult to operate. This is because of friction between the surfaces juxtaposed during the adjustment of the seat. Also because of friction, the slide mechanism receives a large amount of wear each time it is operated.

It is, therefore, an object of this invention to provide a novel fore-aft adjustment mechanism which results in the formation of a superior vehicle seat for off-highway vehicles.

It is another object of this invention to provide a fore-aft adjustment mechanism which is economical both to construct and to maintain.

A further object of this invention is to provide a fore-aft adjustment mechanism which has a greatly reduced amount of friction between its moveable parts during the operation thereof.

Another object of this invention is to provide a fore-aft adjustment mechanism having a unique facility for self-cleaning whereby the mechanism remains easy to use and does not foul even in the normally dirty environment of an off-highway vehicle.

Yet another object of this invention is to provide a fore-aft adjustment mechanism which takes up very little vertical space while remaining capable of attaining the aforementioned objects.

These objects and other features and advantages of the vehicle seat with roller fore-aft adjustment of this invention will become readily apparent upon referring to the following description, when taken in conjunction with the appended drawing.

SUMMARY OF THE INVENTION

A vehicle seat for off-highway vehicles includes a backrest portion and a seat portion which are interconnected. The vehicle seat also includes a support assembly having a first portion and a second portion. The first portion is affixed to the vehicle, and the second portion is affixed, as by scissors or parallelogram type linkages, to the seat portion. A plurality of roller structures have rotational axes which are substantially normal to the surface of the vehicle and the underside of the seat portion. One of said first and second portions includes the roller structures. The other of said first and second portions includes a plurality of parallel guide rails, each guide rail having a horizontally elongated, vertically disposed edge surface. Each roller structure at the periphery thereof engages an edge surface, and longitudinal movement of the vehicle seat with respect to the vehicle is provided for thereby.

BRIEF DESCRIPTION OF THE DRAWING

The vehicle seat with roller fore-aft adjustment of this invention is illustrated in the drawing wherein.

DESCRIPTION OF THE PREFERRED EMBODIMENT

Figure 1:
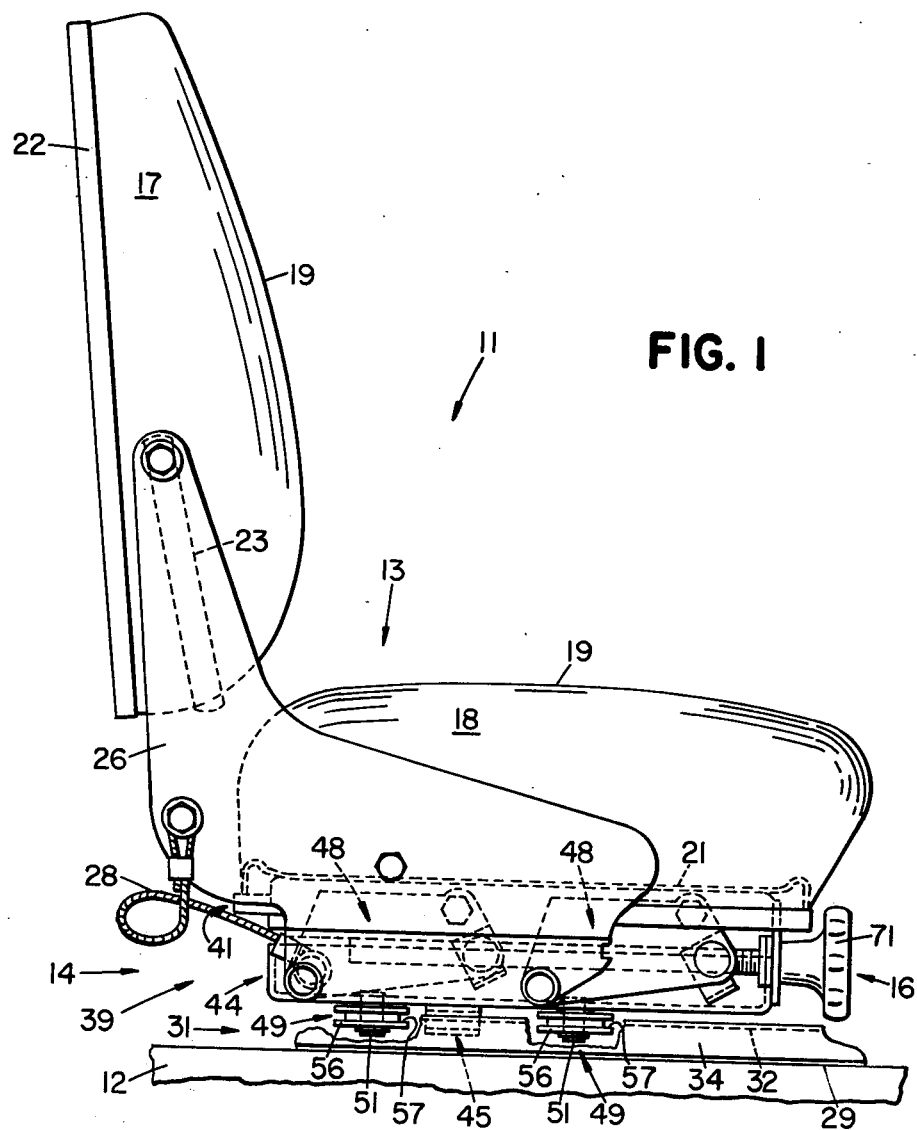
FIG. 1 is a side elevational view of a vehicle seat employing this invention, partially cut away to illustrate the roller structures thereof.
Figure 2:
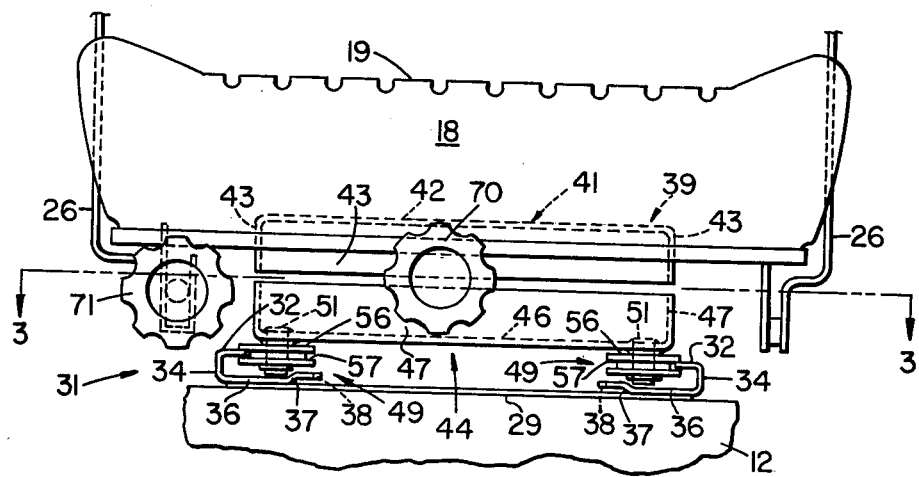
FIG. 2 is a fragmentary, front elevational view, with certain structures, including the latch mechanism, cut away to illustrate the fore-aft adjustment mechanism.

This invention of a vehicle seat with roller fore-aft adjustment is indicated generally at 11 in FIGS. 1 and 2 in attachment with an off-highway vehicle 12. The vehicle seat 11 more particularly includes a seat assembly 13, a support assembly 14 and an adjustment assembly 16.

Referring again to FIG. 1, the seat assembly 13 includes a backrest portion 16 and a seat portion 18. Both portions 17, 18 include cushions (not shown) which have covers 19 disposed thereover. Pans 21 support the cushions (not shown) and covers 19, extrusions 22 being employed to join the covers 19 and pans 21 around the peripheries thereof. The cushions (not shown) employed are typically a polyurethane foam which has been poured into place upon the cover 19, normally a formed piece of polyvinyl chloride. The pans 21 may be formed from metal or plastic.

Upper plates 23 are disposed upon each side of the backrest 17. Brackets 26 are attached to each side of the seat portion 18. The brackets 26 are pivotally affixed to the backrest 17 at the plates 23. One end of a tether cable 28 is affixed to each bracket 26 and depends therefrom. Where the backrest portion 17 is not intended to pivot with respect to the seat portion 18, a single pan 21 is formed and bears both portions 17, 18. The plates 23 and bracket 26 are then not required, and the tether cables 28 depends from the single pan 21.

Figure 3:
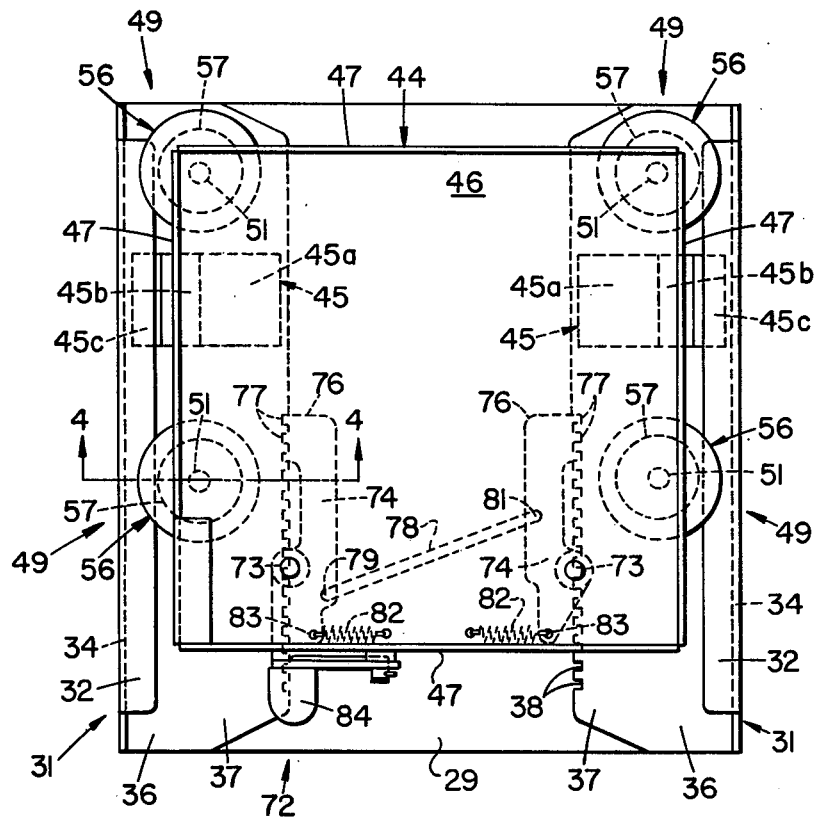
FIG. 3 is an enlarged, top plan view taken along line 3—3 of FIG. 2 and showing the arrangement of the roller structures and the locking mechanisms therefor.
Figure 4:
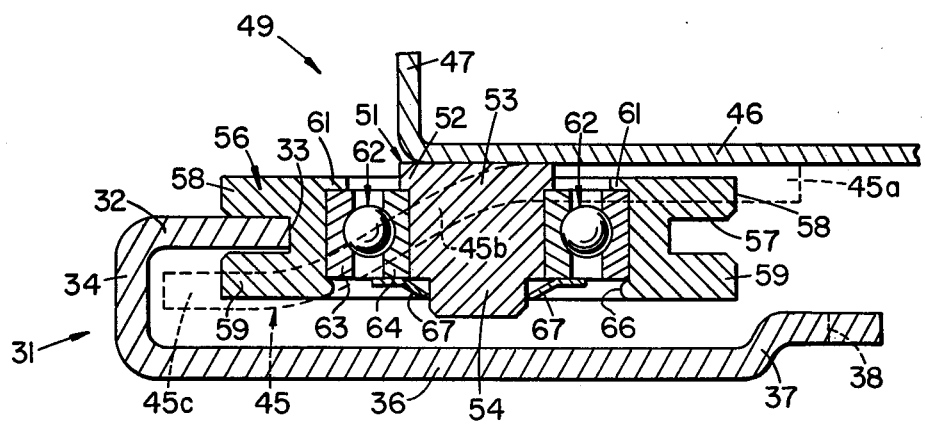
FIG. 4 is an enlarged, fragmentary vertical section taken along line 4—4 of FIG. 3 and showing a roller structure of the fore-aft adjustment mechanism.

Referring to FIGS. 2, 3 and 4, the support assembly 14 includes a first portion affixed to the vehicle 12 and illustrated as having a bottom plate 29. The plate 29 is attached to the vehicle 12. Adjacent the longitudinal edges of the plate 29, a pair of guide rails 31 are joined thereto. The guide rails 31 are disposed in parallel. Each guide rail 31 is elongated and is C-shaped in configuration when viewed from the front (FIGS. 2 and 4). Each guide rail 31 is continuously formed, having a relatively shorter, upper flange portion 32 with a vertically disposed edge surface 33, a vertical interconnecting portion 34, and a relatively longer, lower flange portion 36. The lower flange 36 has an S-shaped, or elevated portion 37 bearing in the forward half thereof a series of notches 38 formed therein (FIG. 3).

Figure 5:
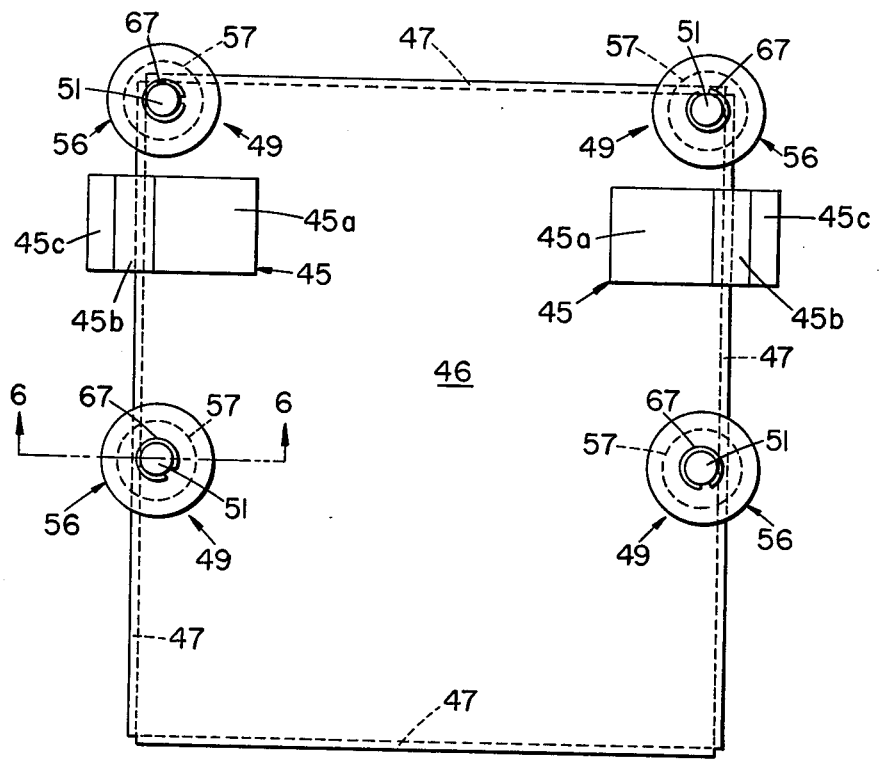
FIG. 5 is a fragmentary, bottom plan view of the roller-carrying base, removed from the lower base and showing the arrangement of the roller structures.
Figure 6:
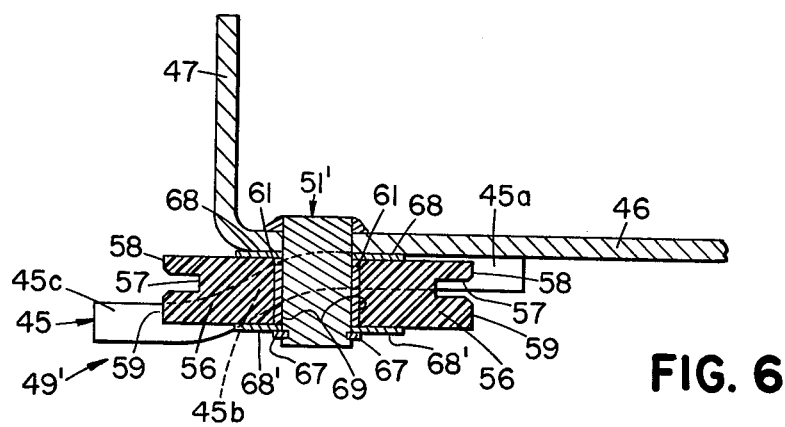
FIG. 6 is an enlarged, fragmentary vertical section taken along line 6—6 of FIG. 5 but illustrating an alternate form of the roller structure of the fore-aft adjustment mechanism.

The support assembly 14 also includes a second portion affixed to the seat assembly 13 and illustrated as having a housing 39, FIGS. 1 and 2. The housing 39 employs an upper member 41 having an upper plate 42 with front, rear and side flanges 43 depending from the edges thereof. The housing 39 also includes a lower member 44. The lower member 44 includes a bottom plate 46 having front, rear and side flanges 47 extending upwardly therefrom. The lower member 44 may also include plate members 45, illustrated in dotted lines in FIGS. 1, 3, 4, 5 and 6. As shown in FIGS. 5 and 6, each plate 45 is elongated and includes a first flat portion 45a, a curved connecting portion 45b and a second flat portion 45c. The first portions 45a are attached to the underside of bottom plate 46. The longitudinal axes of the plates 45 are aligned, are parallel to the front and rear flanges 47 and are normal to the side flanges 47 (FIGS. 3 and 5). The connecting portions 45b extend downwardly away from the bottom plate 46, the second portions 45c being directed away from each other and extending beyond the side flanges 47. The plates 45 are disposed closer to the rear than to the front flange 47. The upper and lower members 41, 44 are joined together at their respective flanges 43, 47. The tether cables 28 are affixed to opposite side flanges 47 of the lower member 44. Four parallelogram linkage members 48 at one end thereof are pivotally attached to the upper member 41, two members 48 being affixed to each side flange 43. At the opposite end thereof, the linkage members 48 are pivotally attached to the side brackets 26. The seat assembly 13 is thereby joined to the support assembly 14. A different linkage, such as a scissors-type linkage, may replace the parallelogram linkage members 48.

A plurality of roller structures 49, four being illustrated herein, are affixed to the housing 39, as shown in FIGS. 2, 4 and 5. Each roller structure 49 (FIG. 4) includes a stepped pivot stud 51 having larger, intermediate and smaller portions 52, 53, 54 in diametral measure. An annular-shaped tread wheel or roller 56 has a groove 57 formed in the peripheral edge thereof, a relatively thinner lip 58 being disposed above the groove 57 and a relatively thicker lip 59 being disposed below the groove 57. The roller 56 has a shoulder 61 formed upon the interior edge thereof, and a ball bearing 62 is pressed against the shoulder 61, the outer race 63 being disposed against the interior edge of the roller 56. The pivot stud 51 is inserted, the inner race 64 of the bearing 62 being disposed against the intermediate portion 53. The roller 56 is deformed or swedged, as at 66, to capture the bearing 62. The retainer ring or fastener 67 is attached over the smaller portion 54 to further capture the bearing 62.

Each pivot stud 51 is affixed normal to the bottom plate 46, as by weldment, the larger portion 52 being disposed against the plate 46. The pivot stud 51 extends downwardly from the plate 46 and bears a roller 56 in a horizontally disposed position. The peripheral groove 57 is engaged by the upper flange 32 of a guide rail 31, the side surface 33 of the rail 31 being disposed against the bottom of the groove 57. The upper lip 58 rests upon the flange 32, and the lower lip 59 is disposed below the flange 32 and within the space between the flanges 32, 36 of the rail 31. The roller structures 49 thereby join the housing 39 to the bottom plate 29 affixed to the vehicle 12, the portions 45c of the plates 45 being disposed within the space between the flanges 32, 36 of rails 31.

The roller structure 49 may be constructed in a number of ways other than that previously described. The roller 56 and outer race 63 of the bearing 62 may be cast as a single piece, the remainder of the bearing 62 being attached thereafter. The shoulder 61 and deformation 66 are thereby eliminated. The pivot stud 51 and inner race 64 may also be cast as a single piece.

FIG. 6 illustrates at 49' alternate forms which the roller structure may take. The pivot stud 51' assumes a constant cross-sectional diameter. A thrust bearing 68 is disposed about the pivot stud 51' between the roller 56 and the bottom plate 46. Another thrust bearing means 68' may also be disposed below the roller 56 and above, or in place of, the retainer ring or fastener 67. A radial bearing 69 may replace the ball bearing 62. Also, where the roller structure 49' is employed in a small, lightweight seat application, such as for a golf cart or a garden tractor, the roller 56 and bearings 68, 69 may be replaced by a unitary structure cast as a single piece from a bearing material such as a plastic.

The adjustment assembly 16, FIGS. 1, 2 and 3, includes weight adjustment and height adjustment mechanisms 70, 71. Neither mechanism 70 or 71 is shown in detail since a number of standard mechanisms may be employed in the seat 11. The weight adjustment mechanism 70 is disposed between the seat assembly 13 and the support assembly 14. The mechanism 70 is operated such that the seat portion 18 is suspended at the midpoint of its vertical travel range when the vehicle operator takes his position in the seat 11. The height adjustment mechanism 71 is disposed in the support assembly 14 and is operable to pivot the linkage members 48 such that the vertical displacement of the seat portion 18 with respect to the vehicle 12 is altered.

The roller structures 49, 49' together with a latch mechanism 72 (FIGS. 2 and 3) provide for fore-aft adjustment. Pivotally affixed at 73 to the bottom plate 46 and toward the front flange 47 are two transversely spaced latches 74. Each latch 74, at the interior end 76 thereof, has a plurality of teeth 77 which are joined normal thereto, depend therefrom, and are longitudinally spaced. The guide rails 31 are oriented such that the notches 38 are directed inwardly, and the latches 74 are oriented such that the teeth 77 are directed outwardly. The latches 74 are interconnected by a diagonal bar 78, the bar 78 being pivotally affixed to one latch 74 at a point 79 intermediate the pivot point 73 and the front flange 47 and being pivotally affixed to the other latch 74 at a point 81 disposed toward the rear flange 47 from the pivot point 73. A return spring 82 is affixed between the exterior end 83 of each latch 74 and the bottom plate 46. A lever 84 is connected to one of the latches 74. Normally, the teeth 77 of the latches 74 engage the notches 38 of the guide rails 31, thereby locking the housing 39 against longitudinal movement with respect to the bottom plate 29. Pivoting the lever 84 downwardly causes one of the latches 74 to rotate in a horizontal plane about its pivot point 73, thereby swinging the interior end 76 thereof away from the guide rail 31 and disengaging the teeth 77 from the notches 38. The one latch 74, through the bar 78, causes the other latch 74 to rotate in a similar manner. The rollers 56 of the roller structures 49, 49' may then rotate about their respective pivot studs 51, 51', traveling along the upper flanges 32 of the guide rails 31. When the fore-aft adjustment has been made, the lever 84 is released, and the springs 82 act upon the latches 74 to pivot them into their normal position, the engagement of the teeth 77 with the notches 38 again locking the housing 39 against longitudinal movement.

The roller structure 49, 49' may alternately be affixed to the bottom plate 29 and the guide rails 31 to the plate 46. The pivot points 73 of the latches 74 would then be affixed to the bottom plate 29, and the return springs 82 would interconnect the exterior ends 83 with the bottom 29. A top plan view of the roller structures 49 or 49' would be similar to FIG. 5, and a bottom plan view of the guide rails 31 and the latch mechanism 72 would be similar to FIG. 3.

In some cases it is desirable to have a vehicle seat 11 where the housing 39 and weight and height adjustment structures 70, 71 have been eliminated. In such cases the roller structures 49 or 49' or the guide rails 31 may be affixed to the underside of the pan 21. Again, top and bottom plan views of the roller structures 49 or 49', guide rails 31 and latch mechanism 72 would be similar to FIGS. 3 and 5.

It can be seen that, since the rollers 56 are horizontally disposed, a substantial savings of vertical space is realized. This is very important, for, in many vehicle cabs, vertical space is at a premium because of the general size of the vehicle and/or because of the need to find space for other necessary equipment. When a roller 56 engages and moves along a guide rail 31, the rotational movement of the roller effects a cleaning of the surfaces of the flange 32. Although dirt and debris may collect on the lower flange 36, the rollers 56 are disposed above it and do not move through it. It can therefore be seen that the fore-aft adjustment mechanism is self-cleaning, does not foul and remains easy to use even in dirty environments. Extensive use of radial and thrust bearings results in a minimum amount of friction. It is therefore apparent that the adjustment mechanism wears well and is easy and economical to maintain. The rollers 56 readily hold the rest of the vehicle seat 11 to the rails 31 and, together with the tether cables 28 and plates 45, which plates 45 can press against rails 31 when the seat 11 is severely stressed, increase the ability of the seat 11 to withstand strong stresses such as large seat belt pulls. A safer seat is thereby provided. A reduced number of parts are employed, and a number of methods for constructing the adjustment mechanism can be used. A manufacturer is therefore able to adopt a method which best fits his existing plant structure. It can be seen that by incorporating the adjustment mechanism a superior vehicle seat is obtained.

Although a preferred embodiment and modifications thereof have been disclosed herein, it is to be remembered that various other modifications and alternate constructions can be made thereto without departing from the full scope of the invention, as defined in the appended claims.

I claim:

1. A fore-aft adjustment and support mechanism for a vehicle seat, comprising: upper base means; fixed, lower base means disposed closely below and out of weight-supporting contact with the upper base means, said upper base means being movable fore-aft relative to the lower base means; a plurality of parallel fore-aft guide rail means fixed to one base means and spaced laterally from and out of weight-supporting contact with the other base means, each rail means having a flat, fore-aft weight-bearing surface; a plurality of guide roller means journaled on said other base means on parallel generally upright axes offset laterally from the respective rail means and cooperative with said respective rail means to carry the entire weight of the upper base means on the lower base means, each roller means including a flat, circular radial face overlapping and engaging flatwise with its associated rail means surface to accommodate total downward loading on the mechanism, whereby the roller means turn about their respective axes by virtue of said engagement with said respective guide rail surfaces as the two base means move relative fore and aft; and releaseable means for selectively locking the two base means against said relative movement fore and aft.

2. The mechanism of claim 1, in which each guide rail surface is flanked by an adjoining, fore-aft guide edge, and each roller has an annular guide portion adjoining and coaxial with its radial face and rollably engageable with the associated guide edge to confine the two base means against relative lateral movement during said relative movement fore and aft.

3. The mechanism of claim 2, in which each guide rail is a laterally directed flange having the aforesaid flat surface as well as a second flat surface parallel to and spaced vertically from the first flat surface, both of said surfaces adjoining said guide edge, and each roller has an annular groove providing the aforesaid radial face as well as a second radial face opposed to said first radial face and flat-wise engageable with the aforesaid second flat surface, the base of said groove providing the aforesaid annular guide portion.

4. The mechanism of claim 3, in which each guide rail flange and its associated roller means groove are so relatively configured as to afford substantially large bearing areas between the associated flat surfaces and radial faces.

5. The mechanism of claim 3, in which each guide rail flange and its associated roller means groove are so relatively configured that the flange surfaces are substantially parallel to each other, the radial faces on each roller means are substantially parallel to each other, the flanges closely fitting their respective grooves, and the guide edges extending substantially to the bases of the respective grooves.

6. The mechanism of claim 3, in which the plurality of roller means is arranged as a front pair of laterally spaced apart roller means and a rear pair of laterally spaced apart roller means spaced rearwardly of the front pair, and means is provided on one base means intermediate the front and rear pairs and extending toward the other base means for engagement with said other base means to prevent vertical separation of one base means from the other in the event of the application of excessive upward forces causing failure of the interengagement between the roller means and the guide rail means.

7. The mechanism of claim 6, in which said last-named means is carried by the base means that carries the roller means and extends toward and is engageable with the guide rail means for the purpose aforesaid.

* * * * *